(12) United States Patent
Beauregard et al.

(10) Patent No.: US 11,851,005 B2
(45) Date of Patent: Dec. 26, 2023

(54) VEHICLE VISUALIZATION SYSTEM COMPRISING AN ACQUISITION DEVICE MOVABLE BETWEEN A DEPLOYED POSITION AND A RETRACTED POSITION

(71) Applicant: FAURECIA INTERIEUR INDUSTRIE, Nanterre (FR)

(72) Inventors: Julien Beauregard, Mesnil en Thelle (FR); Fernandez Rayar, Beauvais (FR); Thibault Le Mesnil, Cergy (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 69 days.

(21) Appl. No.: 17/327,707

(22) Filed: May 22, 2021

(65) Prior Publication Data

US 2021/0362653 A1    Nov. 25, 2021

(30) Foreign Application Priority Data

May 22, 2020  (FR) ..................................... 20 05437

(51) Int. Cl.
   *B60R 1/074*   (2006.01)
   *B60R 1/12*    (2006.01)

(52) U.S. Cl.
   CPC ............ *B60R 1/074* (2013.01); *B60R 1/12* (2013.01); *B60R 2001/1215* (2013.01); *B60R 2001/1253* (2013.01)

(58) Field of Classification Search
   CPC ... B60R 1/074; B60R 1/12; B60R 2001/1215; B60R 2001/1253; B60R 2011/004; B60R 2011/0084; B60R 2011/0092; B60R 2300/8046; B60R 11/04; B60R 1/00; B60R 2300/80

USPC .......................................................... 359/841
   See application file for complete search history.

(56) References Cited

U.S. PATENT DOCUMENTS

| | | | |
|---|---|---|---|
| 4,278,227 A * | 7/1981 | Davis .................... | B60R 1/064 74/502.1 |
| 2017/0282806 A1* | 10/2017 | Peterson ................ | B60R 1/082 |
| 2019/0161014 A1 | 5/2019 | Ko | |

FOREIGN PATENT DOCUMENTS

| | | | | |
|---|---|---|---|---|
| EP | 3489088 A1 | 5/2019 | | |
| GB | 2255539 A | 11/1992 | | |
| JP | 2010116125 A * | 5/2010 | ............... | B60R 1/04 |
| JP | 2010116125 A | 5/2010 | | |

OTHER PUBLICATIONS

French Search Report corresponding to French Application No. FR 2005437, dated Nov. 9, 2020, 2 pages.

\* cited by examiner

*Primary Examiner* — Mohammed A Hasan
*Assistant Examiner* — Rahman Abdur
(74) *Attorney, Agent, or Firm* — Reising Ethington P.C.

(57) ABSTRACT

A visualization system that includes a support member, defining an outer surface and an inner surface, and a visualization device having at least one display device extending on the inner surface of the support member and at least one image acquisition device. The acquisition device includes an image sensor and a base and is movable in relation to the support member between a deployed position, in which the base extends mainly on the outer surface side of the support member, and a retracted position, wherein the base extends mainly on the inner surface side of the support member.

9 Claims, 4 Drawing Sheets

VEHICLE VISUALIZATION SYSTEM COMPRISING AN ACQUISITION DEVICE MOVABLE BETWEEN A DEPLOYED POSITION AND A RETRACTED POSITION

TECHNICAL FIELD

The present invention relates to a system for the visualization of the external environment of a vehicle, of the type comprising at least one support member, defining an outer surface intended to extend outside the vehicle and an internal surface intended to extend inside the vehicle, and at least one device for visualization of the external environment of the vehicle, the visualization device comprising at least one display device extending on the inner surface of the support member and at least one image acquisition device comprising an image sensor and a base, the image sensor being attached to a free end portion of the said base.

The invention also relates to a vehicle door comprising such a visualization system.

BACKGROUND

It is known to replace certain optical mirrors forming rear-view mirrors of the vehicle by image acquisition devices arranged to acquire images of the external environment of the vehicle in order to make it possible in particular to visualize part of the environment at the rear of the vehicle. The images acquired by an acquisition device are for example displayed on a display device extending into the passenger compartment of the vehicle.

However, the image acquisition device, which extends outside the vehicle, is a particularly fragile element that is likely to be degraded, especially when the vehicle is parked.

To overcome this disadvantage, it is known to provide that the image sensor extends in the immediate vicinity of the outer surface of the support member in order to limit the clutter of the visualization device outside the vehicle.

However, in spite of this reduced footprint, the image sensor still extends outside the vehicle and is still susceptible to degradation. In addition, the fact that the sensor is immediately adjacent to the outer surface limits its field of view and the quality of the images acquired, particularly because they show only a limited area around the vehicle.

SUMMARY

One of the objects of the invention is to compensate for these disadvantages by offering a visualization system with reduced fragility and allowing the acquisition of images of a large area of the vehicle's external environment.

To this end, the invention relates to a visualization system of the above-mentioned type, in which the acquisition device is movable relative to the support member and relative to the display device between a deployed position, in which the base extends mainly on the side of the outer surface of the support member, and a retracted position, in which the base extends mainly on the side of the inner surface of the support member.

Thus, in the retracted position, the image sensor extends little or not at all outside of the vehicle and is not susceptible to degradation, particularly when the vehicle is stationary and/or parked. In addition, by selecting an appropriate base size, the image sensor can be moved away from the outer surface of the support member in the deployed position and thus acquire images of a wide area of the vehicle's external environment.

According to various embodiments, the visualization system may include one or more of the following optional features, taken alone or in any technically feasible combination:
the acquisition device is mobile in translation with respect to the support member between the deployed position and the retracted position;
the display device comprises a display surface on which the images acquired by the acquisition device are displayed, the base of the acquisition device extending at least partly opposite and/or along an edge of the said display surface in the retracted position;
the display device comprises a sleeve extending along at least part of an edge of the display surface, the acquisition device moving in the said sleeve between the retracted position and the deployed position;
the free end portion of the base includes a free end, the image sensor extending between the said free end and the outer surface of the support member in the deployed position of the acquisition device;
the free end of the base is substantially flush with the outer surface of the support member in the retracted position;
the support member comprises a deformable member extending in regard of the free end of the base on the outer surface side, the said deformable member being deformed by the base so as to be partially spaced from the outer surface of the support member and to leave a space in which the image sensor extends in the deployed position of the acquisition device;
the visualization device constitutes a single module that can be mounted on the support member.

According to another aspect, the invention relates to a vehicle door of the type comprising a door body defining at least one window and a system for visualization of the external environment as described above, wherein the support member forms part of the body extending in the vicinity of the window.

According to an optional feature of the vehicle door, the support member forms part of a front pillar of the window.

BRIEF DESCRIPTION OF THE DRAWINGS

Further aspects and advantages of the invention will be apparent from the following description, given as an example and with reference to the appended drawings, in which.

DETAILED DESCRIPTION

Figure 1:
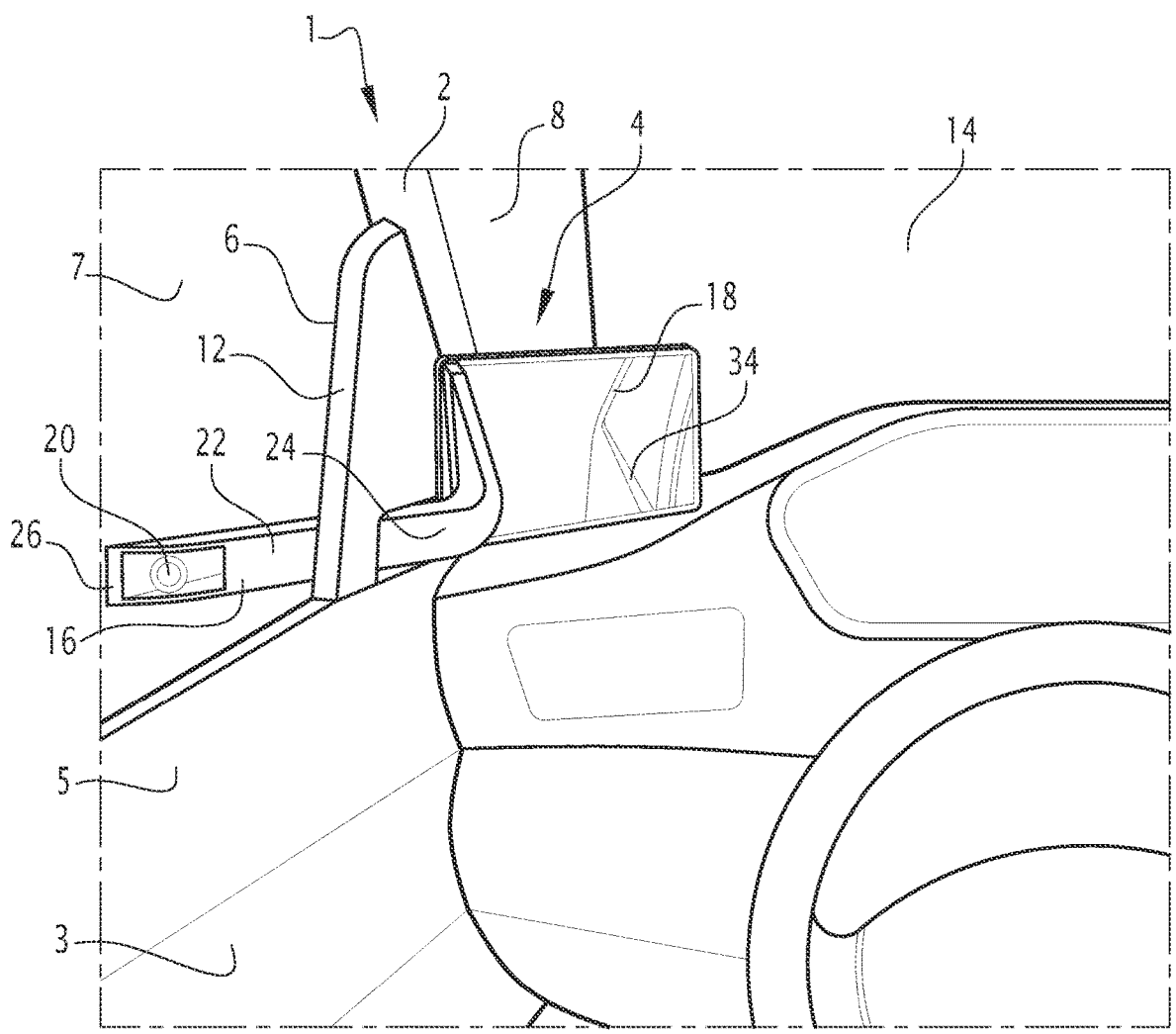
FIG. 1 is a schematic perspective representation of a visualization system according to an embodiment of the invention, viewed from the interior of the vehicle, with the acquisition device in the deployed position.

With reference to FIGS. 1 to 4, a visualization system 1, of the external environment of the vehicle is described for mounting in the passenger compartment of a vehicle, for example, on a vehicle door 3. The visualization system 1 comprises at least one support member 2 and at least one visualization device 4 for the external environment of the vehicle.

For example, the support member 2 is a part of a vehicle door 3, especially a front door of the vehicle, and visualization device 4 is intended to replace the mirror usually mounted on such a door, as will be described in more detail later. Specifically, the door 3 comprises a body 5 defining an opening forming a window 7, which receives a glass pane in a known manner. The support member 2, for example, forms part of the body 5 of the door 3 in the vicinity of the window 7.

Figure 2:
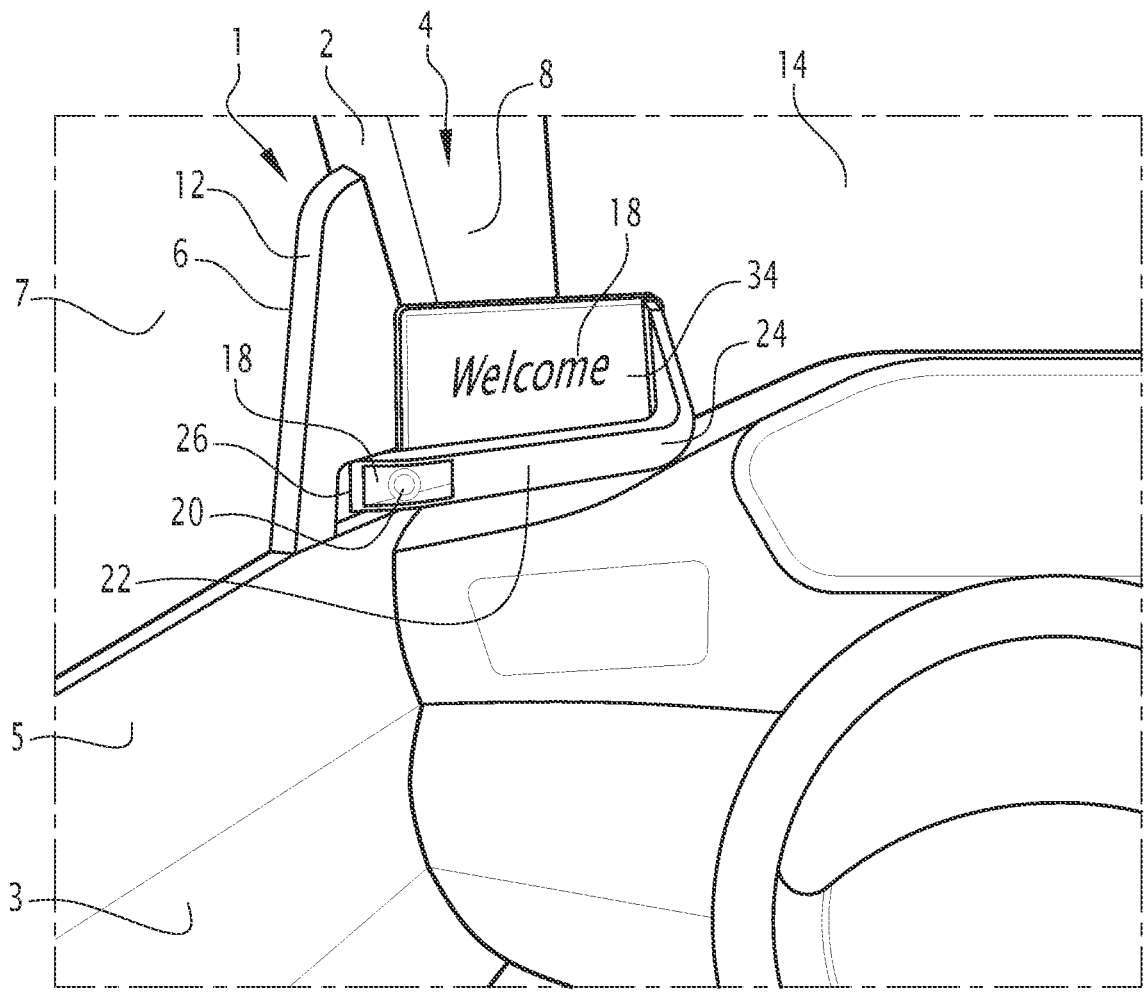
FIG. 2 is a schematic perspective representation of the visualization system of FIG. 1, with the acquisition device in retracted position.

The support member 2 defines an outer surface 6 extending outside the vehicle and an inner surface 8 extending inside the vehicle. In other words, the outer surface 6 forms a portion of the outer surface of the body 5 of the door 3 and the inner surface 8 forms a portion of the inner surface of the body 5 of the door, delineating a portion of the passenger compartment of the vehicle from the exterior of the vehicle when the door 3 is closed, as will be described later. For example, the outer surface 6 of the support member 2 forms part of a body panel of the vehicle door and the inner surface 8 forms a trim element 5 of the door, with the body panel portion and the trim element extending on either side of the window 7. In other words, the support member 2 forms a part of the pillar of the window 7. In particular, the support member 2 forms, for example, the lower front corner 12 of the window pillar. Thus, in relation to a vehicle driver, the support member 2 extends in front of the driver at approximately the same height as the base of a vehicle windshield 14 on the left or right side of the vehicle, as shown in FIGS. 1 and 2. It is understood that the support member 2 may form another part of the vehicle, such as a windshield pillar.

The visualization device 4 comprises at least one image acquisition device 16 and at least one display device 18. In a configuration for visualization of the external environment of the vehicle, the image acquisition device 16 and the display device 18 extend on either side of the support member 2 such that the image acquisition device 16 forms an exterior portion of the visualization device 4 extending outside the vehicle and that the display device 18 belongs to an interior portion of the visualization device 4 extending inside the vehicle. Thus, in this configuration, the image acquisition device 16 protrudes from the outer surface 6 of the support member 2 and the display device 18 is mounted on the inner surface of the support member 2.

The image acquisition device 16 comprises an image sensor 20, such as a camera, and a base 22 for mounting the image sensor 20 on the support member 2 so that the image acquisition device 16 protrudes from the outer surface 6 of the support member 2 to the outside of the vehicle in the configuration for visualization of the external environment of the vehicle.

The image sensor 20 is arranged to acquire images of the environment of the vehicle. In the external environment visualization configuration of the vehicle, the image sensor 20 acquires images of the external environment of the vehicle, specifically the side of the vehicle outside of which the image visualization device 16 extends and an area extending to the rear of the vehicle to inform the driver of the presence of other vehicles and/or obstacles in that external environment.

According to one embodiment shown in FIGS. 1 and 2, the base 22 comprises a first end section 24 mounted on the support member 2 or on the display device 18 and a second free end section extending opposite the end section 24 and carrying the image sensor 20. More specifically, the second free end portion of the base 22 includes a free end 26 extending beyond the image sensor 20 in relation to the outer surface 6 of the support member 2 in the configuration for visualization of the external environment of the vehicle. In other words, the image sensor 20 extends between the free end 26 and the outer surface 6 of the support member 2 in the visualization configuration of the external environment of the vehicle.

The length of the base 22 between the first end portion 24 and the free end 26 may be arranged so that the image sensor 20 is sufficiently spaced from the outer surface 6 of the support member 2 to be able to capture images of a wide area of the vehicle's external environment, in particular towards the rear of the vehicle in the external environment visualization configuration of the vehicle. Thus, for example, the length is such that the field of vision of the image sensor 20 encompasses the entire side of the vehicle and a substantial area extending behind that side of the vehicle.

Figure 3:
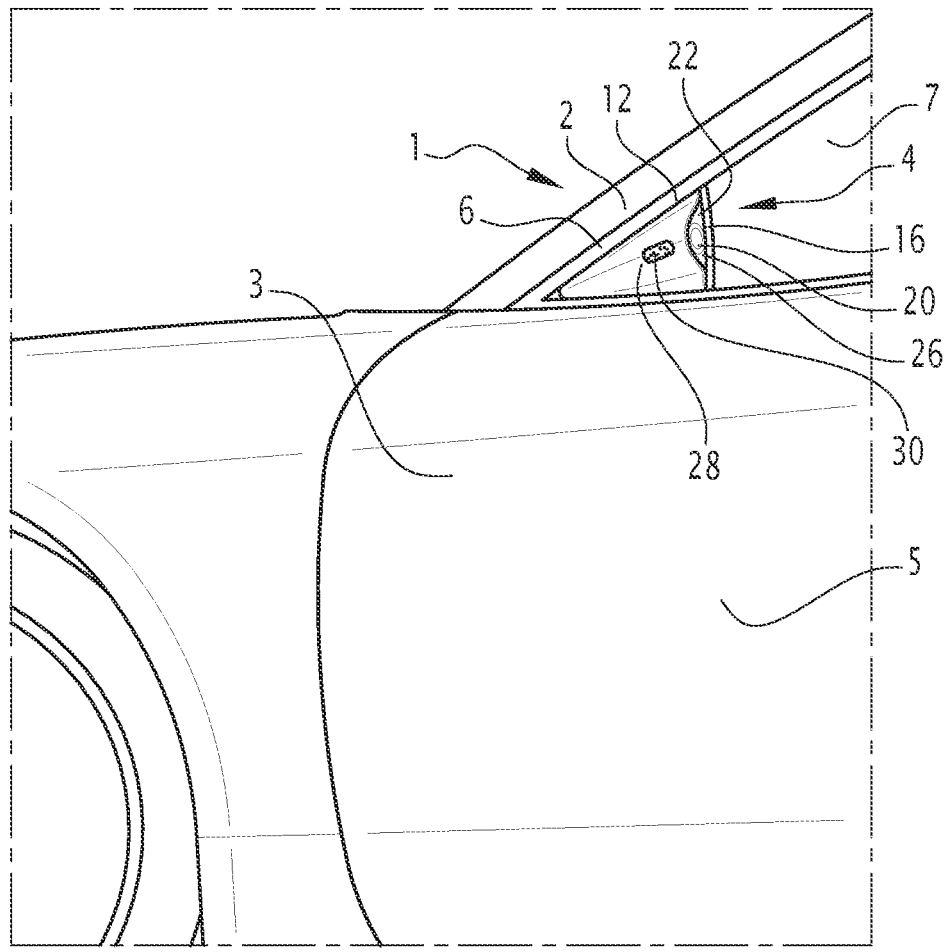
FIG. 3 is a schematic representation in perspective of a visualization system according to another embodiment of the invention, viewed from the outside of the vehicle, the acquisition device being in deployed position.

As will be described in more detail later, the configuration for visualization of the external environment of the vehicle corresponds to at least one deployed position of the acquisition device 16, in which the base 22 extends primarily outside the vehicle, as shown in FIGS. 1 and 3.

Since the image sensor 20 presents reduced dimensions, the dimensions of the base 22 may be arranged to allow it to perform its function as a base for the image sensor 20 while having a reduced surface area to limit the wind pickup of the acquisition device 16 when the base 22 extends outside the vehicle.

As shown in FIGS. 1 and 2, the base 22 is, for example, formed by an arm carrying the image sensor 20 at its second free end. In the deployed position, for example, the base 22 extends substantially perpendicular to the outer surface 6 of the support member 2 protruding from that surface as shown in FIG. 1. Thus, in the configuration for visualization of the external environment of the vehicle, the image acquisition device 16 provides little resistance to airflow around the vehicle and less degradation of the aerodynamic performance of the vehicle compared to a conventional rearview mirror, in which the mirror occupies a relatively large area forming an obstacle to airflow. Indeed, the image acquisition device 16 does not have an optical mirror extending outside the vehicle. It is understood that the base 22 could have a different shape depending on the appearance of the vehicle. Thus, according to one embodiment shown in FIG. 3, the base 22 has a shape adjusted to the image sensor 20 in order to limit the bulk of the base 22 outside the vehicle, the image sensor 20 extending then in the vicinity of the outer surface 6 of the support member 2.

The acquisition device 16 is movable between at least the deployed position (FIGS. 1 and 3) described above, in which the base 22 extends mainly on the outer surface 6 side of the support member 2, and a retracted position (FIGS. 2 and 4), in which the base 22 extends mainly on the inner surface 8 side of the support member 2, i.e. inside the vehicle, into the vehicle passenger compartment. "Extend primarily" means that the majority of the base 22 extends outside of the vehicle in the deployed position, whereas the majority of the base 22 extends inside the vehicle in the retracted position. For example, the major portion is at least two-thirds of the length of the base 22, measured between the first end portion 24 and the free end 26.

In the deployed position, a residual portion of the base 22 may extend into the interior of the passenger compartment, as shown in FIG. 1, or into the support member 2 between the inner surface 8 and the outer surface 6. It is understood that several deployed positions may be provided in which the image sensor 20 is more or less distant from the outer surface 6, for example, depending on the extent of the desired area to be visualized around the vehicle and/or the desired aerodynamic performance of the vehicle.

In the retracted position, the base 22 may include a residual portion extending outside the vehicle or in the support member 2 between the inner surface 8 and the outer surface 6. More particularly, according to one embodiment, in the retracted position, the base 22 extends primarily on the inner surface 8 side of the support member 2 such that the image sensor 20 extends into the passenger compartment and is capable of capturing images of the vehicle interior in a visualization configuration of the interior environment of the vehicle. Alternatively, in the retracted position, the image sensor 20 may extend between the inner surface 8 and the outer surface 6 of the support member 2. According to one embodiment, in the retracted position, the free end 26 of the base 22 is flush with the outer surface 6 of the support member 2 so that it extends continuously with the outer surface 6 of the support member 2. Thus, in the retracted position, the outer surface 6 presents a satisfactory continuous appearance when viewed from the outside of the vehicle. According to yet another embodiment, the image sensor 20 extends at least partially to the outside of the vehicle in the retracted position and is, for example, immediately adjacent to the outer surface 6 of the support member 2.

The movement of the base 22 between the deployed and retracted position is, for example, a translational movement relative to the support member 2 according to one sliding direction. According to one embodiment, the sliding direction is substantially perpendicular to the outer surface 6 of the support member 2. Such a sliding direction is, for example, also substantially perpendicular to the inner surface 8 of the support member 2. Alternatively, the sliding direction is inclined in relation to the outer surface 6 of the support member 2 and forms an angle for example substantially comprised between 60° and 90° with the outer surface 6. The translation of the base 22 moves through the support member 2, i.e. a part of the base 22 passes through the support member 2 from the inner surface 8 to the outer surface 6 side when the acquisition device 16 moves from the retracted to the deployed position. Conversely, part of the base 22 passes from the outer surface side 6 to the inner surface side 8 when the acquisition device 16 moves from the deployed to the retracted position. For this purpose, the support member 2 comprises a through-opening in the outer surface 6 and in the inner surface 8, whereby the base 22 moves in these through-openings between the deployed and retracted positions. Each through-opening has a shape that, for example, is substantially complementary to the contour of the base 22. According to one embodiment, the base 22 closes the through-openings in all positions of the acquisition device 16 in order to prevent all communication between the outside and inside of the vehicle through these through-openings.

Figure 4:
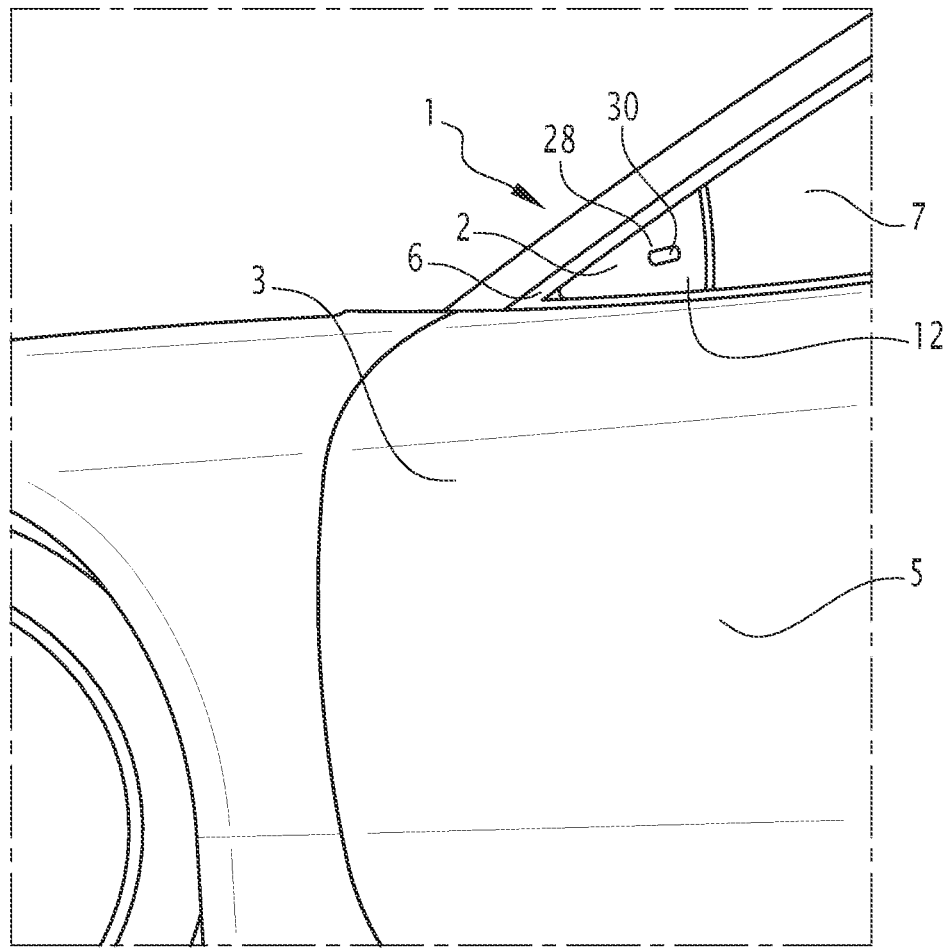
FIG. 4 is a schematic representation in perspective of the visualization system of FIG. 3, with the acquisition device in retracted position.

According to the embodiment shown in FIGS. 3 and 4, the support member 2 furthermore comprises a deformable element 28 on the outer surface 6 of the support member 2 facing the acquisition device 16, this deformable element 28 masking the acquisition device 16 from the outside of the vehicle in the retracted position of the acquisition device 16, as shown in FIG. 4. In a deployed position of the acquisition device, the deformable element 28 is arranged to deform so that it is partially separated from the outer surface 6 of the support member 2 by the base 22 in order to free a space in which the image sensor 20 extends in order to acquire images of the external environment of the vehicle, as shown in FIG. 3. For example, the deformable element 28 is arranged to conform to the shape of the base 22, in particular, the free end 26, when the acquisition device 16 is in a deployed position and the deformable element 28 is deformed. The deformable element 28 is for example formed by an elastically deformable membrane extending over all or part of the outer surface 6. Thus, the deformable element 28 allows the masking of the acquisition device 16 and of the opening in the outer surface 6 of the support member 2 when the acquisition device 16 is not used to visualize the external environment of the vehicle, thus improving the appearance of the external side of the visualization system. In addition, the visible surface of the deformable element 28 can be used for signage purposes, for example by adding a light source 30 arranged to emit light onto this visible surface, as shown in FIGS. 3 and 4.

It is understood that in addition to being movable between the deployed and retracted position, the orientation of the image sensor 20 can be adjusted, for example by providing that the image sensor 20 is movable in relation to the base 22, for example in rotation.

According to an alternative embodiment, the acquisition device 16 is movable in rotation between the deployed and retracted position. In this case, the axis of rotation is, for example, substantially parallel to the outer surface 6 and inner surface 8 of the support member 2 and passes through a front end of the base 22, which is spaced from the window 7, when the image sensor 20 is adjacent to the window 7.

The connection technology of the image sensor 20, i.e. the cable(s) for power supply and transmission of a signal representative of the images acquired by the acquisition device extend from the image sensor 20 to the interior of the vehicle, for example, through the interior of the base 22, and may be connected directly to the display device 18. It is understood that "directly connected" means that the image sensor connection technology does not necessarily require a connection to the electronic system of the vehicle so that the visualization system may, according to one embodiment, be simply mounted in one piece in the vehicle, for example, as a replacement for a rear-view mirror of the vehicle The display device 18 comprises a screen 34 arranged to display at least the images acquired by the image acquisition device 16. The screen 34 thus forms a display surface for the images acquired by the image acquisition device 16.

The display area extends according to a principal direction D. "Extending in a principal direction D" means that the largest dimension of the display area is measured according to this principal direction D. Thus, for example, for a substantially rectangular display area, the principal direction D extends according to the length of the display area. For a substantially ovoid or oval display surface, the principal direction D corresponds to the largest dimension of the shape. According to one embodiment, the principal direction D corresponds to the sliding direction of the base 22 between the retracted and deployed positions. The display device 18 protrudes from the inner surface 8 of the support member 2 into the passenger compartment of the vehicle, for example, so that the display surface extends opposite a lower corner of the windshield support 14.

The screen 34 can also be a touch screen, allowing for example, to adjust the display on the screen 34, the position of the acquisition device 16, the orientation of the image sensor 20 and/or the magnification of the images captured, by touch directly on the display surface of the screen 34. The display device can also be arranged to display information other than the images acquired by the visualization device 16, as will be described later.

For example, the visualization system can be arranged to recognize obstacles in the external environment of the vehicle and displayed on the screen 34. In this case, it is possible, for example, to modify the images displayed by the screen 34 in order to highlight the presence of obstacles, for example by changing the color of these obstacles, by surrounding them or in another manner.

Between the deployed and retracted positions, the acquisition device 16 is movable in relation to the support member 2 and in relation to the display device 18.

Thus, according to one embodiment and as more particularly visible in FIG. 2, the acquisition device 16 extends opposite the display surface of the screen 34 in retracted position, and more particularly along an edge of the latter. Thus, in the retracted position, the acquisition device 16 increases only slightly the size of the visualization system inside the passenger compartment. Alternatively, the acquisition device 16 slides along an edge of the display surface outside the display, for example below the screen. Thus, instead of increasing the thickness of the display device 18, the acquisition device 16 increases its height. According to a particular embodiment, the display device 18 comprises a sleeve extending along the screen according to the principal direction D and the acquisition device 16 extends into the sleeve in the retracted position and moves outside the sleeve from the retracted to the deployed position.

When the acquisition device 16 is in the retracted position, the image sensor 20 may be arranged to acquire images of the interior of the passenger compartment of the vehicle, as described above. In this case, for example, these images are displayed on the display surface of the screen 34. Such a configuration for visualization of the interior environment of the vehicle may, for example, be part of a security system of the vehicle, such as capturing images of the interior of the vehicle in the event of a break-in. Such a configuration can also be used for entertainment purposes by filming the occupants of the vehicle when the vehicle is stationary.

The movement of the acquisition device 16 between the retracted and deployed positions can be controlled automatically according to a vehicle condition. Thus, the acquisition device 16 is for example arranged to move to the retracted position when the vehicle is stopped and possibly when the ignition is switched off. Conversely, the acquisition device 16 is arranged to switch to the deployed position when the vehicle is about to be set in motion. As an alternative or as a complement, the movement of the acquisition device can be synchronized with that of the door 3 on which the visualization system is installed. Thus, the acquisition device 16 is for example arranged to be in a retracted position when the door is being opened or closed, which limits the risks of interference between the acquisition device and an obstacle outside the vehicle when the door is opened or closed.

According to one embodiment, two visualization systems 1 as described above provided respectively on the front right and left doors 3 of the vehicle. Thus, the vehicle can be completely devoid of an optical mirror on the outside of the vehicle.

The visualization system described above makes it possible to effectively and advantageously replace the traditional vehicle rear-view mirrors by being simple to install, by reducing the size of the vehicle, by improving its aerodynamic performances by providing that the external part of the visualization device(s) includes only the acquisition device 16. The visualization system also improves driving conditions for the driver by having the display device as part of the interior part or of the visualization device(s). In addition, the acquisition device is less likely to be degraded, particularly when the vehicle is stationary.

The invention claimed is:

1. A visualization system for the external environment of a vehicle, comprising:
    at least one support member, defining an outer surface for extending outside the vehicle and an internal surface for extending inside the vehicle, and
    at least one visualization device of the external environment of the vehicle, the visualization device comprising at least one display device extending on the inner surface of the support member and at least one image acquisition device comprising an image sensor and a base, the image sensor being attached to a free end portion of said base,
    wherein the acquisition device is movable relative to the support member and to the display device between a deployed position, in which the base extends mainly on the side of the outer surface of the support member, and a retracted position, in which the base extends mainly on the side of the inner surface of the support member,
    wherein the support member comprises a deformable element extending opposite a free end of the base on the side of the outer surface, said deformable element being deformed by the base when the acquisition device is in the deployed position so as to be partially spaced from the outer surface of the support member and to provide a space between the deformable element and the outer surface of the support member in which the image sensor extends in the deployed position of the acquisition device, and
    wherein the acquisition device is movable through an opening in the support member between the deployed position and the retracted position, the deformable element being flat on the opening and on the acquisition device in the retracted position of the acquisition device and being deformed away from the outer surface of the support member in the deployed position of the acquisition device.

2. The visualization system according to claim 1, wherein the deformable element masks the acquisition device from the outside of the vehicle in the retracted position of the acquisition device.

3. The visualization system according to claim 1, wherein the acquisition device is translationally movable relative to the support member between the deployed position and the retracted position.

4. The visualization system according to claim 1, wherein the display device comprises a display surface on which the images acquired by the acquisition device are displayed, the base of the acquisition device extending at least partly opposite and/or along an edge of the said display surface in the retracted position.

5. The visualization system according to claim 4, wherein the display device comprises a sleeve extending along at least a portion of an edge of the display surface, the acquisition device moving in said sleeve between the retracted position and the deployed position.

6. The visualization system according to claim 1, wherein the free end of the base is substantially flush with the outer surface of the support member in the retracted position.

7. The visualization system according to claim 1, wherein the acquisition device constitutes a single module adapted to be mounted on the support member.

8. A vehicle door comprising a door body, defining at least one window, and including the visualization system of claim 1, wherein the support member forms a part of the body extending in the vicinity of the window.

9. The vehicle door according to claim 8, wherein the support member forms part of a front pillar of the window.

\* \* \* \* \*